May 20, 1952   J. KALLENBORN   2,597,106
ELECTRICALLY CONDUCTIVE STRIPE APPLICATOR
Filed Jan. 10, 1947   4 Sheets-Sheet 1

Inventor
JOHN KALLENBORN
Olen E. Bee
Attorney

May 20, 1952  J. KALLENBORN  2,597,106
ELECTRICALLY CONDUCTIVE STRIPE APPLICATOR
Filed Jan. 10, 1947  4 Sheets-Sheet 4

INVENTOR.
JOHN KALLENBORN
BY
Olen E Bee
ATTORNEY.

Patented May 20, 1952

2,597,106

UNITED STATES PATENT OFFICE 2,597,106

ELECTRICALLY CONDUCTIVE STRIPE APPLICATOR

John Kallenborn, Port Allegany, Pa., assignor to Pittsburgh Corning Corporation, Allegheny County, Pa., a corporation of Pennsylvania Application January 10, 1947, Serial No. 721,285

3 Claims. (Cl. 118—221)

The present invention relates to processes of and apparatus for applying stripes to sheets of glass and it has particular relation to such process and apparatus as may be employed to apply stripes of electrically conductive material contiguous to the edges of sheets of glass, the margins of which are to be heated electrically, bent and welded to a second sheet in order to form a double glazed unit.

One object of the invention is to provide a process of and an apparatus for applying stripes of electrically conductive material to glass sheets by use of which stripes of great uniformity as to width and film thickness are obtained.

A second object is to provide a process of and apparatus for striping sheets of glass which are substantially automatic in operation.

These and other objects will be apparent from consideration of the following specification and the appended drawings.

It has heretofore been proposed to construct double glazed units which can be substituted for conventional single plates or panes of glass in windows by heating to the softening point and then bending over the edges of one pane or plate of glass and sealing a second pane or plate thereto by fusing or sintering the contacting portions to provide a sealed monolithic unit. Such units are characterized by the permanent exclusion of moisture from the interior thereof. Also the air or other gas sealed therein provides an excellent non-conductive medium for heat which constitutes the unit and excellent heat insulator. An excellent process of and apparatus for constructing units of the foregoing type is disclosed in a patent to D. E. Gray 2,398,525. In the patented process the heating of the edges of the glass is effected by localized electrical conductance. In order to initiate the electrical heating operation it is desirable to apply a stripe of an electrically conductive material such as aquadag (a water suspension of graphite) near to but slightly spaced from the margins of the glass sheets. After the heating operation has been adequately initiated the glass itself constitutes a conductor and heating can be so continued even after the aquadag film has been burned away.

In order to obtain uniform bending and welding of the heated portions of glass, it is essential that the conductive stripes of aquadag be uniform in thickness and width so as to obtain uniform conductivity about the entire perimeter of each sheet of glass. Heretofore, the aquadag stripes have been applied by passing the glass between the conventional rollers acting much the same as ringer rollers or nipper rollers. However, by means of such crude apparatus it has been difficult or impossible to obtain the accurate spacing of the stripes and uniformity as to thickness and width of the coatings so essential to satisfactory performance of the subsequent welding steps.

In accordance with the provisions of the present invention, it is proposed to obviate the foregoing difficulties in the striping of glass sheets to be welded together by carrying the sheets upon a conveyor having guide flanges maintaining the sheets accurately positioned with respect to the striping apparatus. As a further feature the invention contemplates the provision as a striping device of rollers engaging the lower face of the glass near two opposite edges, the rollers being resiliently supported so that they follow the irregularities in the surface of the glass, and further being driven in such manner as to oppose the movement of the glass sheets being striped. As a still further feature the invention contemplates provision of two longitudinally spaced sets of striping devices and means between for mechanically and accurately rotating or indexing a sheet of glass striped in one direction by one set of devices through a desired angle and then feeding it to the second striping mechanism for striping in another direction.

For a better understanding of the invention, reference may now be had to the accompanying drawings in which like numerals refer to like parts throughout.

In the drawings, Fig. 1 is a plan view of an apparatus constructed in accordance with the provisions of the present invention;

Figs. 6, 6a and 6b are views of a plate of glass showing certain stages involved in its treatment.

Figure 1:
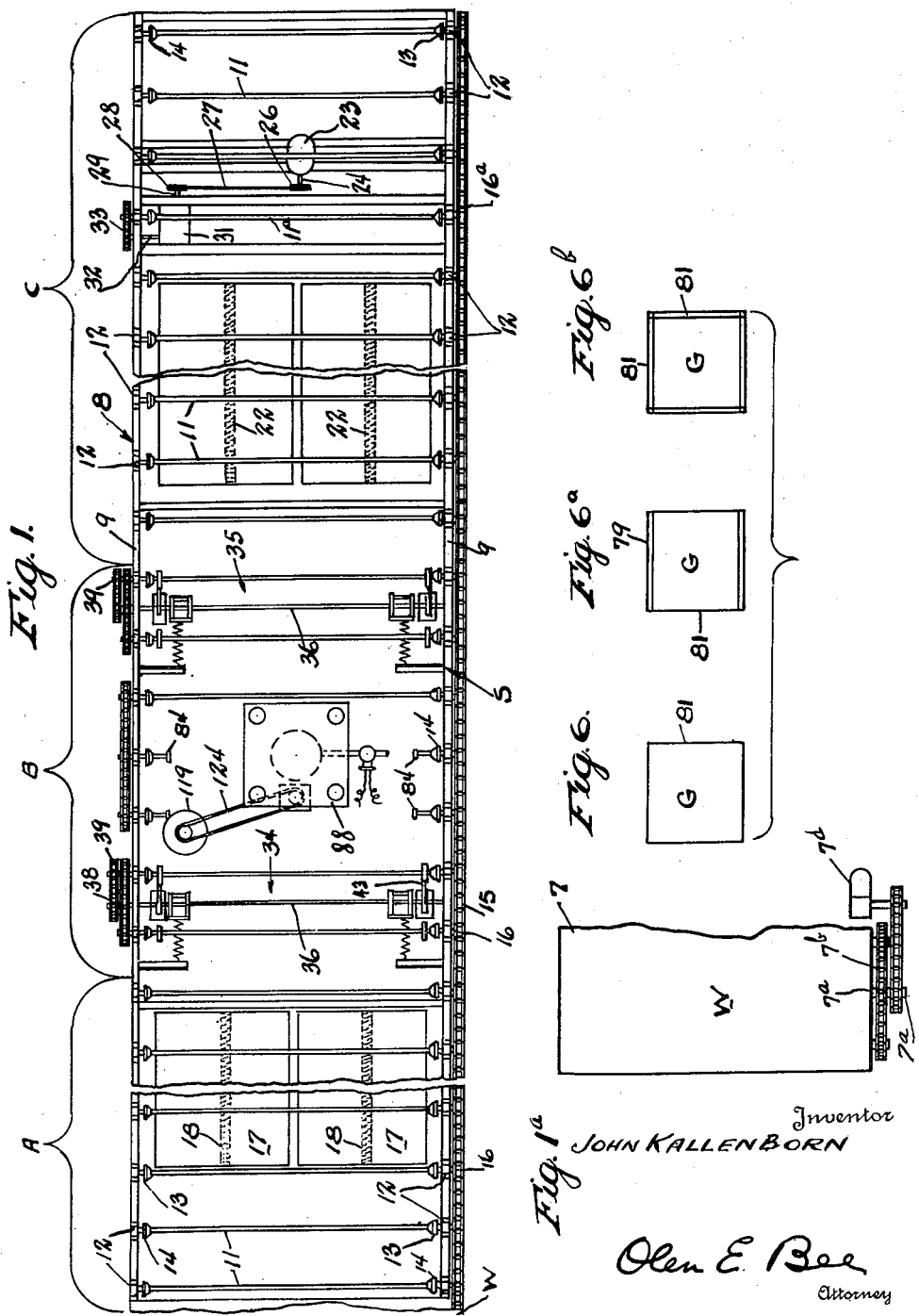
Fig. 1a is a fragmentary plan view of a washer to be employed with striping mechanism and being shown as broken therefrom.

The apparatus as shown in the drawings, two units W and S, W being any convenient embodiment of apparatus designed preliminarily to wash the glass and including a shell 7 designed to prevent splashing of wash liquids. Conveyor rollers 7a driven by flexible connection such as a belt or chain 7b carry the glass plates through the washer. A chain or belt trained about a gear 7c on one of the shafts is also driven by a suitable motor and speed reducing mechanism 7d.

Unit S is the striping mechanism proper and comprises a framework designated broadly at 8 with side rails 9, lower platform 9a and upright supports 10. The apparatus S may be considered as comprising sections A, B and C.

Section A constitutes a loading and preheating section or reach, section B comprises a striping and indexing mechanism adapted to apply stripes slightly spaced from all four margins of a plate of glass and section C comprises a section or reach for drying the stripes upon glass plates and for unloading the glass from the system. Sections A and C include conveyor rollers 11 journaled at their extremities in bearings 12 shown in Fig. 1. The rollers are provided contiguous to the side rails with axially adjustable guide flanges 13 preferably approximately of frusto conical axial section and having shoulders 14 upon which the plates of glass (G) are adapted to ride so that the plates are supported by their extreme edges, leaving the surfaces to be striped free of contact and obviating any tendency to smear the stripes before they are dried. Mechanism for driving the conveyor rollers 11 includes a sprocket chain 15 engaging sprocket gears 16 upon the extremities of the rollers.

Below the rollers in section A, are disposed preheaters such as electrical heaters including reflectors 17 and heating coils 18 disposed thereabove designed to preheat the glass before the stripes are applied thereto.

Section C is substantially similar to the section A and also includes the rollers 11, journaled in bearings 12 and similarly driven by the sprocket chain 15. Heater elements 22 below the conveyor rollers are designed to heat the glass upon the rollers for purposes of drying the aquadag stripes.

Appropriate mechanism for driving the conveyor system includes a motor 23 upon the platform 9a and having a drive shaft 24 to which is secured a pulley or sprocket gear 26 having a flexible driving element such as a V belt or sprocket chain 27 trained thereabout. The drive element 27 also engages gear or pulley 28 upon a shaft 29 of a speed reducing mechanism 31 of conventional design. This mechanism is provided with a power take-off shaft 32 having an appropriately driving connection 33 with a conveyor roller indicated for purposes of distinction as 11a. The latter, in turn drives the sprocket 16a and chain or belt 15.

Figure 2:
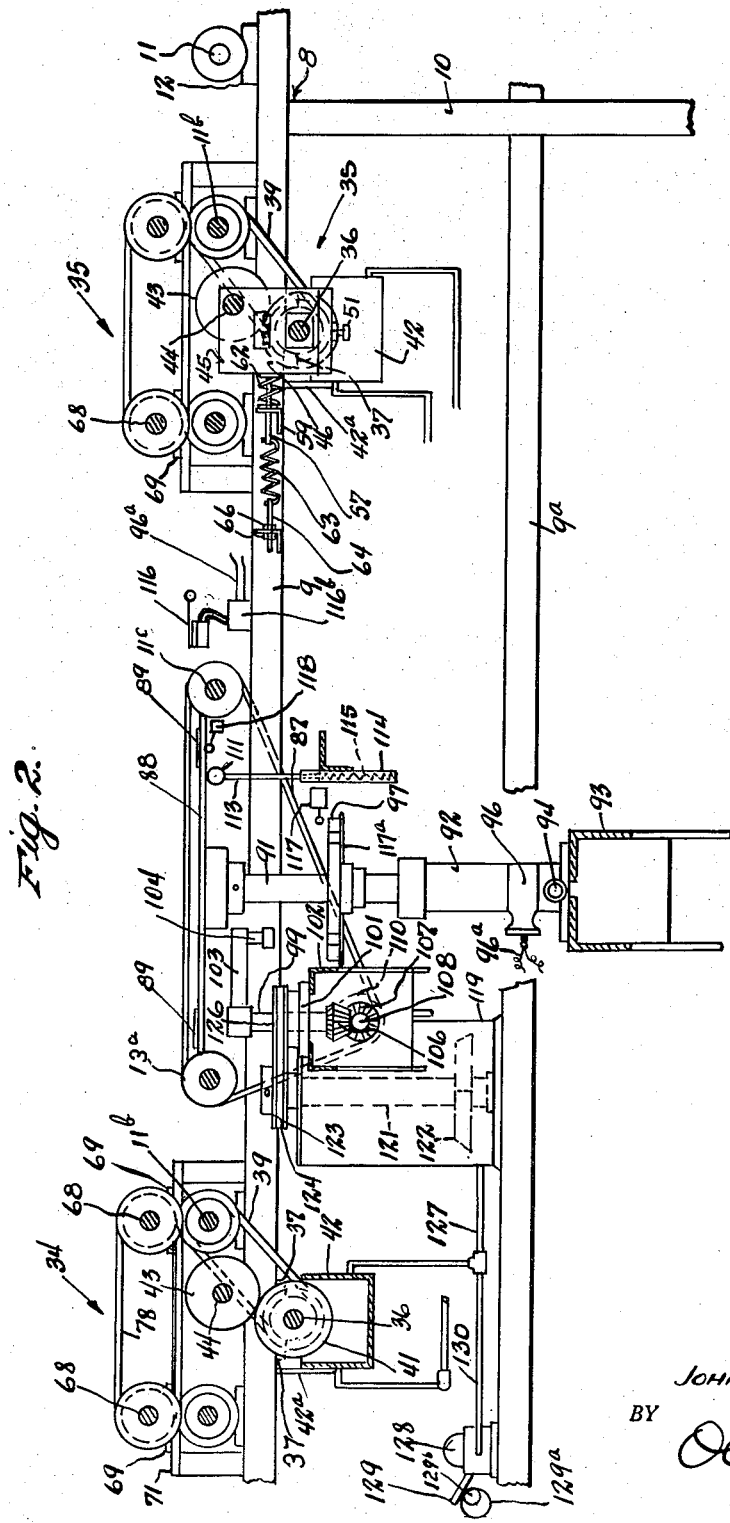
Fig. 2 is a fragmentary sectional elevational view of a portion of the apparatus shown in Fig. 3 taken on line II—II of the latter figure.
Figure 3:
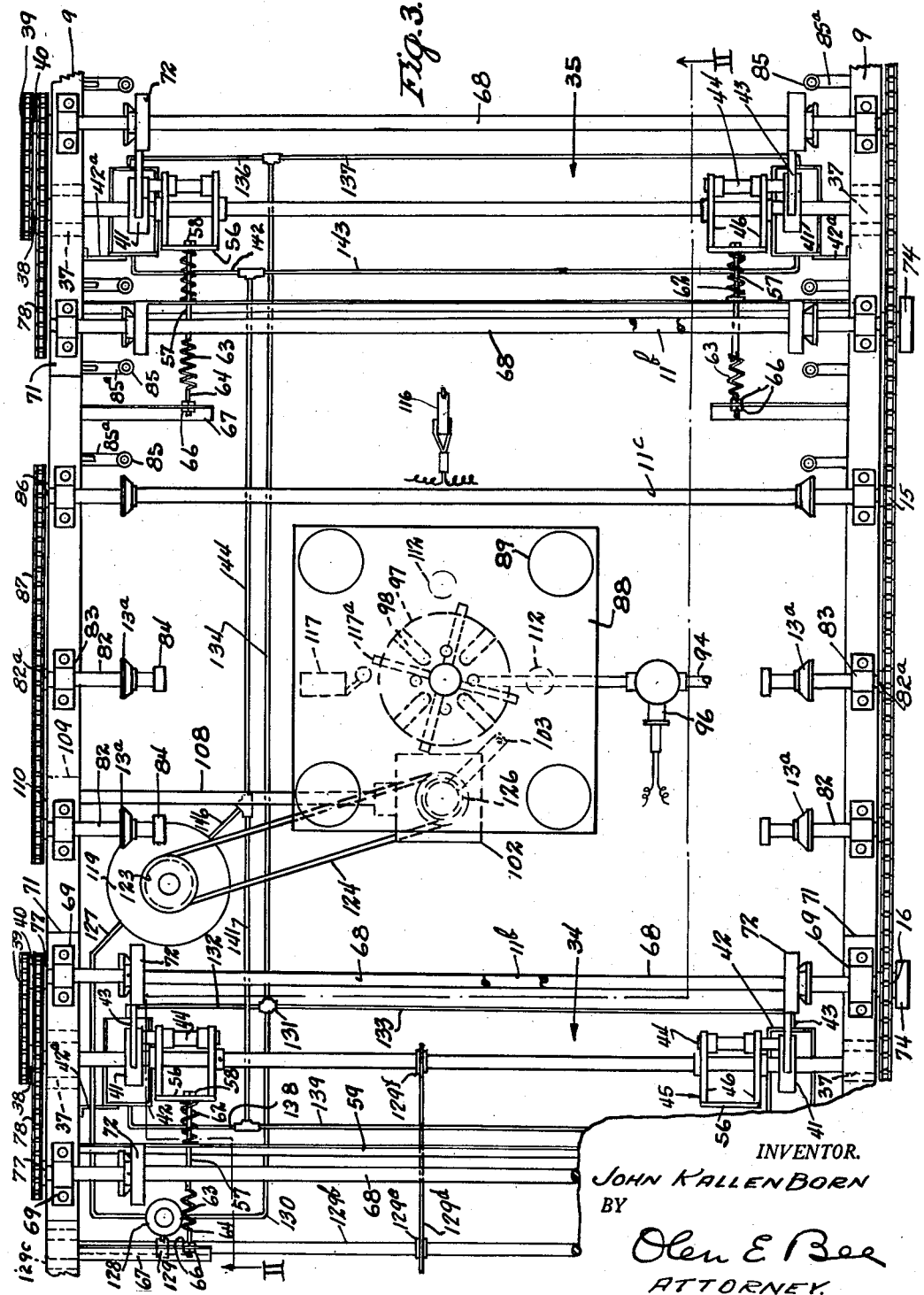
Fig. 3 is a fragmentary plan view of the portion of apparatus shown in Fig. 2.

Mechanisms indicated broadly in Figs. 1, 2 and 3 as 34 and 35 for applying stripes slightly spaced from the edges of the plates of glass are longitudinally spaced with respect to each other and are of duplicate construction. Therefore, description of one is believed to be sufficient for both. The mechanisms include transverse rollers 36 journaled in bearings 37 shown in dotted line in Fig. 2 as being disposed below the rails 9. Each of these rollers is provided with a sprocket gear or a V belt pulley 38, shown in Fig. 3 about which is trained a flexible connection, e. g., a sprocket chain or a V belt 39 further trained about a sprocket or pulley 40 upon one shaft or roller distinguished as 11b of the conveyor system. The shaft or roller 36 is further provided with a pickup roller 41 keyed or otherwise appropriately fixed upon the shaft and dipping into a suitable trough or container 42 for the striping material such as a suspension of graphite in water conventionally known as aquadag. The trough may be supported in any convenient manner, e. g., by brackets 42a (Fig. 3) on frame 8.

Figure 4:
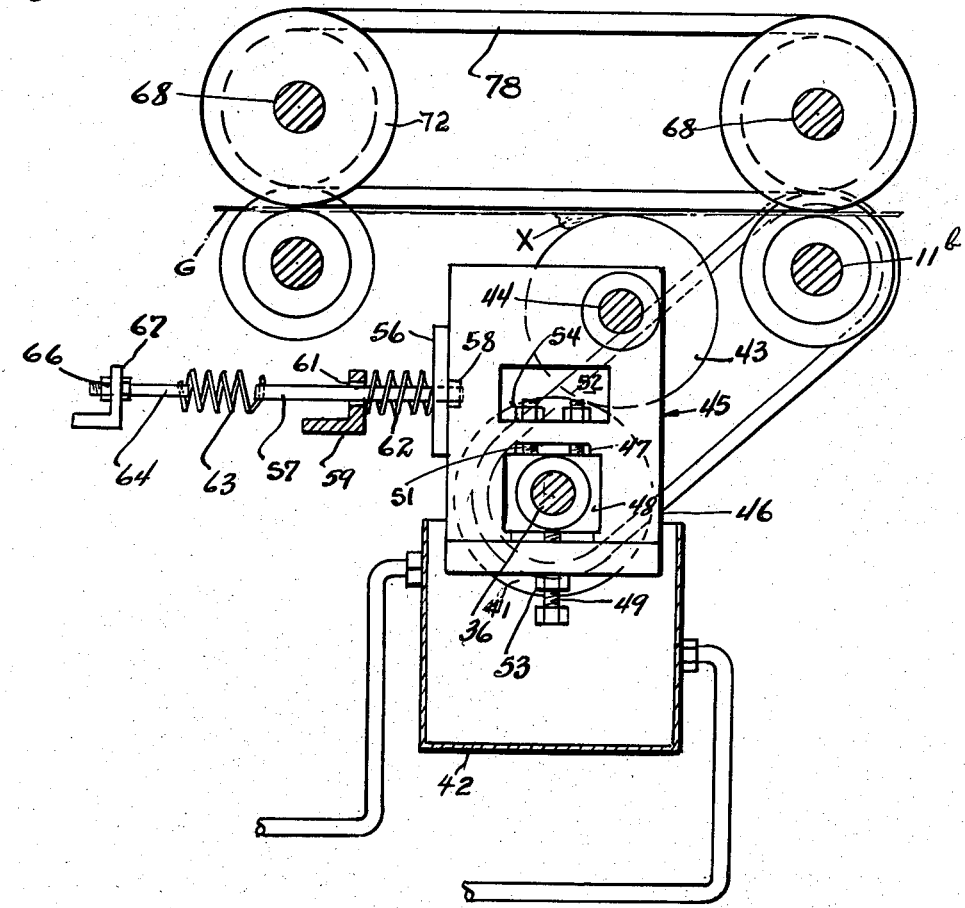
Fig. 4 is a fragmentary sectional view taken substantially upon the lines IV—IV of Fig. 3.

Applicator mechanism for picking up aquadag from the roller 41 and applying it as a uniform strip to the surface of a plate of glass G includes a disc or roller 43 of appropriate width, keyed upon a stub shaft 44, which in turn is journaled in a frame or housing element 45. These elements 45 as shown in Fig. 4 include ends 46 of rectangular outline and have an opening 47 formed therein in which opening a bearing block 48 upon the shaft 36 is slidably disposed. These blocks 48 are adjustable in the slot 47 by means of set screws 49 and 51 threaded in the element 46 and bearing at their extremities upon the lower and upper surface of the block 48. In order to admit of access to the set screws 51, an opening 52 is formed in the element 46 above the opening 47 into which opening the upper extremities of the screws 51 project. Nuts 53 and 54 upon the set screws constitute means for locking said screws in any desired position of adjustment. It will be apparent that by appropriately adjusting the screws 49 and 51 position of the applicator disc 43 may be varied at will in order to increase or decrease the pressure between the pickup roller 41 and the applicator roller disc.

It is also to be observed that the applicator roller 43 by reason of its drive connections is driven in a direction opposite to the drive of a plate of glass upon the conveyor system. This opposed travel assures that a small bank or bubble X of aquadag suspension will be maintained upon the lower surface of a plate of glass which is being striped. The bubble, because of its pendent position, does not tend to spread or smear outwardly. This feature adds substantially in the application of striping of uniform width and thickness.

In order to maintain uniform contact of the applicator roller 43 with a plate of glass G passing thereover, spring pressed mechanism for the housing 45 is provided. This mechanism includes a cross bar 56 interconnecting end elements 46 and being provided with a rod 57 appropriately threaded thereinto. The rod, it is to be observed, is also provided with a nut 58 engaging the cross bar positively to lock the bolt in position and a cross bar 59 interconnecting the rails 9 is provided with an opening 61 through which the rod 57 extends. The housing elements 45 are urged away from the bar 59 and also away from the glass plates traveling over the conveyor system by means of a helical spring 62 coiled about the rod and engaging at opposite extremities respectively with the bar 56 and bar 59. To counteract spring 62, the outer end of rod 57 is also provided with a helical tension spring 63 which is appropriately secured to the rear extremity of a rod or bolt 64 which is secured by means of locking nuts 66, in a bracket 67 upon the contiguous rail 9. Adjustment of the bolts or rods 57 and 64 permits the counterbalancing of the tension on springs 62 and 64 to attain any desired degree of pressure on glass plates G by striping roller 43. Moreover, the pressure is very uniform regardless of irregularities in the glass.

Suitable mechanism for holding a plate of glass securely upon the conveyor system while it is being striped by a roller 43, includes hold-down rollers 68, appropriately journaled in bearings 69 upon any convenient supporting device such as a platform 71 carried upon the rails 9. These holddown rollers are disposed in pairs upon opposite sides of the applicator or striping rollers 43 approximately in vertical alignment with two contiguous conveyor rollers, one of said conveyor rollers of course being roller 11b, carrying the driving connection for the pickup roller 41. Rollers 68 are provided with discs 72 preferably of rubber or other material having considerable degree of resiliency and also adapted to engage relatively firmly with the edge portions of a plate of glass upon the conveyor system.

Figure 5:
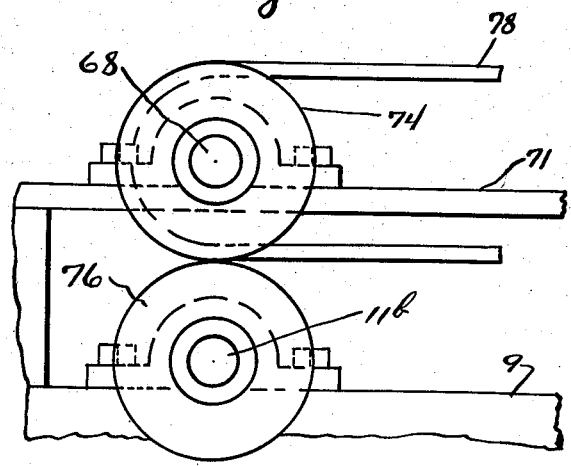
Fig. 5 is a fragmentary detail view of the drive of certain hold down rollers shown in Figs. 2, 3 and 4.

For purposes of providing a drive for the holddown rollers, one of them is also provided as shown in Figs. 3 and 5 with a frictional drive disc 74 having frictional contact with a corresponding disc 76 upon the extremity of shaft 11b opposite to the sprocket gear 40. Shafts 68 are also provided with sprocket gears or V belt pulleys 77 about which is trained a suitable flexible drive connection 78 such as a sprocket chain or V belt in order to drive both shafts synchronously.

It will be understood that the striping mechanism 34 applies stripes of aquadag along two opposite edges of the plate of glass G. Such stripes are indicated at 79 in Fig. 6a of the drawing. In order to stripe the plates along edges indicated at 81 in the same figure, the plate is rotated through an angle of 90° and then passed through the striping mechanism 35. For purposes of effecting this rotation of the plates, suitable indexing mechanism is provided as shown in Figs. 2 and 3. The glass after it passes through striping mechanism 34 and preparatory to being indexed is supported by its edge portions upon frusto conical discs (13a) corresponding to discs 13 previously described which discs 13a are fixed upon stub shafts 82 having appropriate bearings 83 upon the side rails 9. If the plates to be striped are rectangular rather than square, it will be manifest that the discs 13a will not function when the glass is rotated to present the narrow side longitudinally of the conveyor. To accommodate for such contingency cylindrical discs 84 (preferably knurled) are provided on shafts 82. Vertical rollers 85 upon brackets 85a are also provided to assist in guiding the plates. Discs 84 receive and carry the glass if it is too narrow to rest on discs 13a.

It will be apparent that the stub shafts are further provided with sprocket gears 82a which upon one side of the mechanism are driven by the chain 15 in synchronism with the shafts 11. In order to provide a driving connection for the stub shafts upon the opposite side of the system, a shaft 11c of the conveyor system is provided upon the extremity opposite to the sprocket chain 15 with a sprocket gear 86 about which is trained a sprocket chain 87 further trained about sprocket gears 84 of the stub shafts 82. By means of these driving connections all of the stub shafts are driven in synchronism and are further synchronized with the remaining conveyor rollers of the system.

Between the ends of shafts 82 is disposed suitable mechanism for lifting plates of glass from the discs 13a and for indexing them through the desired angle. This mechanism includes a platform 88 having pads of rubber or other friction material indicated at 89 secured thereupon for purposes of engaging the lower surface of a plate of glass to be indexed. The platform is also supported upon a vertical shaft 91 having a piston (not shown) upon its lower extremity reciprocating in a cylinder 92. This cylinder is supported in any convenient manner, e. g., upon a base 93, which may be mounted upon the floor or secured to the framework 8, as may be desired. Upward actuation of the shaft 91 is effected by fluid under compression, e. g., compressed air by means of an appropriate inlet 94, controlled by an electrically actuated valve 96 having conductors 96a, which will be described in another portion of the present specification. Gravity may be relied upon to return the shaft after pressure is released in cylinder 92.

For purposes of rotating the column or shaft 91 and platform 88 after they have been elevated to lift a plate of glass from the discs 13a, a suitable Geneva movement is provided, which in this case includes a disc 97, keyed upon the shaft and having slots 98, formed at appropriate angular intervals. The drive mechanism for this disc includes a vertically disposed shaft 99 rotatably mounted in a bearing 101, upon a support 102. This shaft, at its upper extremity, carries a horizontal arm 103, rigidly fixed thereupon and have at its outer extremity a downwardly projecting pin 104, adapted to engage the slots 98, when the shaft 91 is actuated upwardly to raise the platform 88. This pin may be mounted to permit vertical sliding in its socket in arm 103, thus obviating the possibility of damage to the mechanism should the shaft 91 accidentally be elevated while the arm 103 is over disc 97. The pin will then merely rise and ride over the top of the disc, but will drop down to operative position after the arm has rotated sufficiently far.

Shaft 99 is further provided at its lower extremity with a bevel-gear 106 engaging a corresponding gear 107 upon a transversely extended shaft 108. Shaft 108 at its outer extremity, is journaled in an appropriate bearing 109 and is also provided with a sprocket gear 110, which is engaged by the lower reach of the sprocket chain 87 driving stub shafts 82.

For purposes of preventing over-running of the platform 88 after it has been indexed by the pin 104 engaging slots 98, a suitable detent device is provided. This device includes a ball element 111 engaging depressions 112 formed at angular intervals of 90° in the lower face of the platform the ball being carried upon the upper extremity of a supporting rod 113. The rod extends downwardly into a casing 114 containing a helical spring 115 adapted to actuate the rod upwardly in order to maintain continuous contact between the ball 111 and the indexing platform.

For purposes of initiating upward movement of the platform 88 when a plate of glass is in position thereabove suitable limit switches are provided. These include switch 116 and a stepping relay 116b, the latter of which is provided with a connnection to the valve mechanism 96 in order to provide for upward actuation of the piston 91.

The glass plate striking the limit switch 116 actuates the relay 116b to open the valve 96 thus elevating platform 88. When the platform is lowered, again permitting the glass to strike the switch 116 the stepping relay will operate to neutralize or open the circuit of the valve, thus preventing the valve from opening until the glass has cleared the platform. The stepping relay will have then advanced to close the circuit preparatory for the sequence involved in the indexing of the next plate. Inasmuch as the switch 116 and relay 116b are standard pieces of apparatus that can be purchased by catalogue or over the counter of dealers, it is not deemed necessary to describe the details or circuits thereof.

Mechanism to operate valve 96 to release the pressure in cylinder 92 includes a limit switch 117 in the electrical circuit of the valve and disposed to be contacted by arms 117a below the disc 97 when shaft 91 is in elevated position and is rotated by arm 103. There are four of the arms 117a so that during each indexing of the platform 88 the valve 96 is operated at the proper moment to return the platform to its lower position before the arm 103 can make another circuit and again rotate the disc 97.

It will be apparent that if the washer W were fed and operated continuously during the interval while the glass plates are being indexed, there would be a tendency for the plates from behind to pile up on the indexing mechanism. To obviate this tendency, a switch 118 is provided in position to be engaged and operated by the platform 88 when the latter is lowered and to be released when the platform is raised. This switch is appropriately connected to stop the feeding of the washer at the proper intervals. This may be accomplished by connecting the switch in the circuit of motor and speed reducing mechanism 7c to stop the latter to produce the desired intervals in the line of glass plates.

It will be understood suspensions of conductive material such as graphite in water in the reservoir or troughs 42 of the striping mechanism may tend to settle out upon appreciable periods of sanding. In order to prevent such settling, which would be detrimental to the uniformity of the coatings applied to plates of glass, suitable mechanism for circulating and agitating the suspension is provided. This apparatus includes a tank or reservoir 119, disposed upon the platform 9a. A vertical shaft 121 within this reservoir carries agitator blades 122 designed to stir up the contents of the container. At its upper extremity the shaft 121 is provided with a V pulley or a sprocket gear 123 which is driven by a flexible connection such as a chain or belt 124, further trained about a sprocket or pulley 126 upon the shaft 99.

The container 119 is provided with an outlet conduit 127 which as shown best in Fig. 3 leads to a pumping mechanism such as a conventional automobile fuel type pump 128 maintained upon the platform 9a. This pump is provided with an operating lever 129 actuated by a rotary cam 129a upon a shaft 129b. This shaft is journaled in bearings 129c and may be driven in any convenient manner, e. g. by a flexible connection such as a belt 129d running on pulleys 129e and 129f on shafts 129b and 36.

A conduit 130 connected to the pump, leads to a branched connection 131 having conduits 132, 133 and 134 branching therefrom. Conduits 132 and 133 supply the reservoir of the striping mechanism 34 while the connection 134 has branches 136 and 137 supplying the reservoir on opposite sides of the striping mechanism 35.

For purposes of returning suspended conductive material from the various reservoirs 42, a suitable system is provided. This includes branches 138 and 139 from the reservoirs of the striping mechanism 34 discharging into a conduit 141. The reservoirs of the mechanism 35 also discharged into branch conduits 142 and 143 and discharging into line 144. Lines 141 and 144 in turn discharge into inlet conduit 146 leading to the reservoir 119.

It will be apparent to those skilled in the art that the forms of the invention described are typical. It will be apparent that numerous modifications may be made therein without departure from the spirit of the invention or the scope of the appended claims.

I claim:

1. An apparatus for applying a stripe of electrically conductive finely divided solid material in aqueous suspension to a sheet of glass, said apparatus comprising a conveyor system for advancing the sheet of glass in a predetermined direction, stripe applying mechanism disposed below the plane of a sheet of glass upon the conveyor mechanism, said striping system comprising a reservoir for electrically conductive material, a shaft, a housing disposed upon the shaft, a driven pickup roller for electrically conductive material rigidly fixed upon the shaft dipping into said electro-conductive material in said reservoir, a striping roller having a shaft journaled in the housing and contacting with the pickup roller and being driven by the pickup roller in a direction to oppose the travel of a sheet of glass upon the conveyor, presser rollers engaging the top surface of said sheet of glass at points substantially spaced upon opposite sides from point of contact of the striping roller and means to drive the presser rollers in synchronism with the conveyor system.

2. An apparatus for uniformly striping a glass sheet with an electrically conductive material in suspension, comprising a frame, a conveyor for moving the glass sheet forwardly in a substantially horizontal plane mounted in said frame, a shaft rotatably mounted in said frame, said shaft being positioned approximately right angularly with respect to the direction of movement of said glass sheet, a reservoir mounted on said frame below said shaft and through which a suspension of striping material is constantly circulated to maintain a uniform suspension, a driven suspension feed roller mounted on said shaft and having its peripheral edge in contact with the suspension in said reservoir, a housing rotatably mounted on said shaft, said housing being vertically adjustable with respect to said shaft, a stub shaft rotatably mounted in said housing and extending horizontally therefrom parallel to said first named shaft, a striping roller mounted on said stub shaft and having the peripheral edge thereof engaged with the peripheral edge of said feed roller to exert pressure thereupon, the pressure between said striping and feed rollers being variable in response to variations in the vertical adjustment of said housing to control the amount of suspension fed to said striping roller, said striping roller being driven by said feed roller in a direction opposite to the forward movement of said glass sheet, and resilient means connected to said frame and said housing for urging the striping roller supported by said housing into contact with said glass sheet.

3. An apparatus for applying uniform stripes of electrically conductive material to the faces of glass sheets moving through the apparatus, comprising a conveyor means for forward movement of the sheets in a substantially horizontal plane, at least two striping mechanisms disposed in longitudinally spaced relation along and beneath said conveyor means, each stripe applying mechanism including a rotating stripe applying roller disposed in the path of movement of the glass sheets and means for maintaining uniform pressure of the roller in contact with the glass sheet, an indexing and elevating mechanism mounted beneath said conveyor means and disposed between the spaced stripe applying mechanisms in the path of movement of the glass sheets, said indexing and elevating mechanism having a vertically reciprocable member for removing a glass sheet from the conveyor and rotating the sheet a predetermined number of degrees in the plane of movement of said sheet for striping by the next striping mechanism, control means associated with the indexing and elevating mechanism and conveyor means to stop forward movement of the glass sheet from the time the glass sheet moves into position above the vertically reciprocable member until the member completes its cycle of removing the sheet from the conveyor means, rotating the sheet, and returning it to the conveyor means.

JOHN KALLENBORN.

REFERENCES CITED

The following references are of record in the file of this patent:

UNITED STATES PATENTS

| Number | Name | Date |
| --- | --- | --- |
| 896,751 | Norton | Aug. 25, 1908 |
| 1,568,605 | Hough | Jan. 5, 1926 |
| 1,857,769 | Silberstein | May 10, 1932 |
| 2,167,589 | Schutz | June 25, 1939 |
| 2,199,228 | Obenshain | Apr. 30, 1940 |
| 2,476,097 | Kagen | July 12, 1949 |